United States Patent
Dörsam et al.

(10) Patent No.: US 10,316,512 B2
(45) Date of Patent: Jun. 11, 2019

(54) ADAPTIVE OSCILLATION DAMPER HAVING A VERTICAL SPRING MECHANISM

(71) Applicant: ESM ENERGIE-UND SCHWINGUNGSTECHNIK MITSCH GMBH, Heppenheim (DE)

(72) Inventors: Mathias Dörsam, Birkenau (DE); Michael Seeger, Lautertal (DE)

(73) Assignee: ESM ENERGIE-UND SCHWINGUNGSTECHNIK MITSCH GMBH, Heppenheim (DE)

(*) Notice: Subject to any disclaimer, the term of this patent is extended or adjusted under 35 U.S.C. 154(b) by 0 days.

(21) Appl. No.: 15/529,714

(22) PCT Filed: Nov. 24, 2015

(86) PCT No.: PCT/EP2015/002363
§ 371 (c)(1),
(2) Date: May 25, 2017

(87) PCT Pub. No.: WO2016/087030
PCT Pub. Date: Jun. 9, 2016

(65) Prior Publication Data
US 2017/0328058 A1    Nov. 16, 2017

(30) Foreign Application Priority Data
Dec. 5, 2014 (EP) ................................. 14004123

(51) Int. Cl.
*E04B 1/98* (2006.01)
*F16F 7/116* (2006.01)
(Continued)

(52) U.S. Cl.
CPC ............. *E04B 1/985* (2013.01); *E04H 12/00* (2013.01); *F03D 13/20* (2016.05); *F03D 80/88* (2016.05);
(Continued)

(58) Field of Classification Search
CPC ...... E04B 1/985; E04B 1/98; F05B 2260/502; F16F 7/116
(Continued)

(56) References Cited

U.S. PATENT DOCUMENTS 6,233,884 B1 * 5/2001 Tipping .................... E04H 9/02
52/167.1
2015/0322923 A1   11/2015 Könitz et al.

FOREIGN PATENT DOCUMENTS

CN          200949272 Y     9/2007
DE    10 2012 222 191 A1    6/2014
(Continued)

OTHER PUBLICATIONS

English translation of SU1076662 (Year: 2018).*
(Continued)

*Primary Examiner* — Patrick J Maestri
(74) *Attorney, Agent, or Firm* — Davis & Bujold PLLC; Michael J. Bujold (57) ABSTRACT

An oscillation damper for damping unwanted oscillations in oscillation-sensitive systems, such as tall edifices and towers, especially wind turbines. The oscillation damper has a vertical spring mechanism and the oscillation characteristics, such as the frequency and amplitude, and thus the damping capabilities, can be adjusted across a wide range of values.

10 Claims, 4 Drawing Sheets

(51) Int. Cl.
  *F03D 13/20* (2016.01)
  *F03D 80/80* (2016.01)
  *E04H 12/00* (2006.01)
(52) U.S. Cl.
  CPC ......... *F16F 7/116* (2013.01); *F05B 2260/502* (2013.01); *Y02B 10/30* (2013.01)
(58) Field of Classification Search
  USPC ....................................................... 52/167.1
  See application file for complete search history.

(56) References Cited

FOREIGN PATENT DOCUMENTS

JP 57-140942 A 8/1982
SU 1076662 A 2/1984

OTHER PUBLICATIONS

International Search Report Corresponding to PCT/EP2015/002363 dated Feb. 29, 2016.
Written Opinion Corresponding to PCT/EP2015/002363 dated Feb. 29, 2016.

\* cited by examiner

ADAPTIVE OSCILLATION DAMPER HAVING A VERTICAL SPRING MECHANISM

FIELD OF THE INVENTION

The invention relates to a pendulum damper for damping undesired vibrations in vibration-sensitive systems, for example tall buildings and towers, in particular wind turbines.

In particular, the invention relates to a pendulum damper whose vibration characteristics and thus damping abilities, such as frequency and amplitude, can be adjusted over a broad range. This is achieved in accordance with the invention by a spring device which acts in predominantly in the vertical direction and has in its totality a predominantly progressive or non-linear spring characteristic line.

BACKGROUND OF THE INVENTION

In particular, wind turbines (WTs) are systems which are susceptible to vibration. In order to keep the vibration amplitude of the WT low in the case of resonance stimulation, damping devices are usually integrated into the WT system. These dampers must be matched to the resonance frequency of the respective WT. The stiffness of the WT, its mass and the stiffness of the pedestal, which also depends on the characteristics of the ground, are primarily determined here by the inherent frequency of the WT.

A stiff pedestal results in a high resonance frequency of the WT and vice versa. A lower mass results in a higher inherent frequency of the WT and vice versa. During installation of the structure, precisely this situation applies. There are temporary states in which only the tower without nacelle and rotor can be stimulated to resonance by the wind. For this case, the inherent frequency of the semifinished WT is much higher than in the case of the later fully installed structure. A similar situation may occur during erection or construction of tall slim edifices (towers, multistorey buildings, etc.).

In order to be able to obtain optimum damping performance, the damper frequency must be adaptable to the respective structure frequency, particular tower frequency, and variable in a large range.

Figure 1:
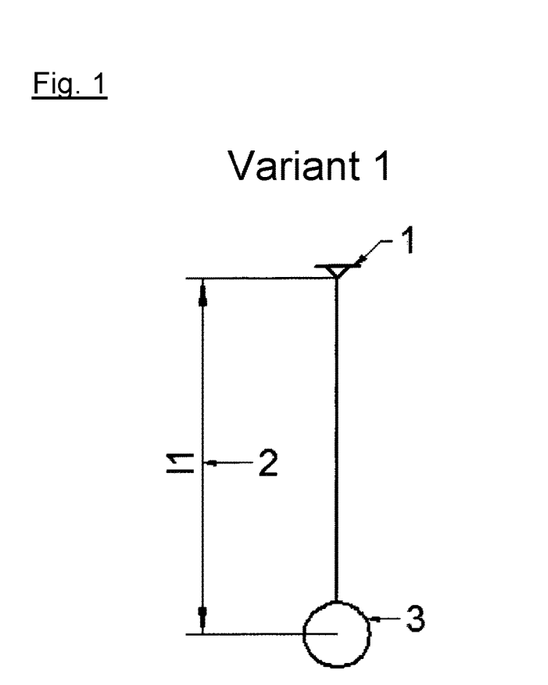
FIG. 1 shows a diagrammatic view of variant 1 of a simple pendulum damper.

If, for example, a simple pendulum damper (variant 1; FIG. 1) is regarded as a point mass, its frequency is only dependent on the pendulum length l1 (2). The physical correlation can be described as follows:

$$f = \frac{1}{2*\pi} * \sqrt{\frac{g}{l1}}$$

g→gravitation constant [m/s^2]
l1→pendulum length [m]

The frequency can thus only be influenced by the pendulum length. In practice, in particular in space-restricted WTs, this can by contrast, only be modified to a limited extent.

Figure 2:
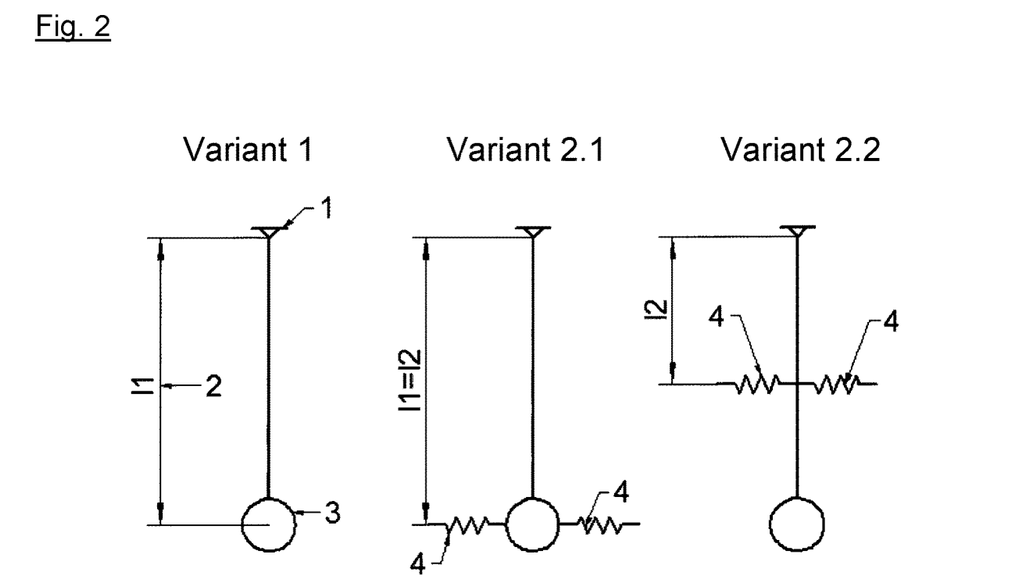
FIG. 2 shows diagrammatic views of variants 1, 2.1, and 2.2 of a simple pendulum damper.

In order to obtain further adjustment possibilities for the damper frequency of a pendulum damper, variant 1 can usually be supplemented with horizontal springs. In the case of variant 2.1, these horizontal springs (4) act at the height of the damper mass (3). In the case of variant 2.2, these are moved in the direction of the suspension point (1) (FIG. 2).

This physical correlation of systems 2.1 and 2.2 can be described as follows:

$$f = \frac{1}{2*\pi} * \sqrt{\frac{C*l_2{}^{\wedge}2}{m*l_s{}^{\wedge}2} + \frac{g}{l_1}} \rightarrow \text{Equation 1; Variant 2.2}$$

$$f = \frac{1}{2*\pi} * \sqrt{\frac{C}{m} + \frac{g}{l_1}} \rightarrow \text{Equation 2; Variant 2.1}$$

g→gravitation constant [m/s^2]
l1→pendulum length [m]
l2→length from pivot to point of action of horizontal spring [m]
C→spring stiffness of horizontal spring [N/m]
m→damper mass [kg]

it can be seen that the damper frequency can now be adjusted via a number of parameters.

Such solutions have already been described frequently in the prior art. The horizontal springs (4) are subjected to tensile stress. Due to the position of installation, the horizontal springs (4), in the case of variant 2.1, see the same displacement as the damper mass (3). They are consequently subjected to very high dynamic loads, which makes a durable design, for the given construction space, very difficult to impossible.

In order to minimise the displacement of the horizontal springs (4), they can be moved further in the direction of the suspension point of the damper (1) (variant 2.2). In this position, they see less displacement, but in this constellation the spring stiffness of these springs must increase in order to achieve the same performance compared with variant 2.1. In addition, this requires a flexurally stiff pendulum length (2), which more or less excludes the use of cables.

If the mass moves to the right, the left-hand horizontal spring (4) is stretched further and the right-hand horizontal spring (4) is relieved of load. In this constellation, it must be ensured that the relieving spring is not completely relieved of load. This means that this horizontal spring (4) is pretensioned more in the middle position than the vibration displacement of the damper mass (3) can be. This fact makes installation difficult.

As already mentioned, the damper frequency is purely dependent on the spring stiffness of the horizontal springs (4) and the pendulum length. If it is now intended to set a different frequency, it is necessary to install a horizontal spring (4) having a different spring stiffness for a given, constant pendulum length (2), as is likewise frequently found in the prior art. By contrast, an increase in the spring pretension force has no influence on the damper frequency.

SUMMARY OF THE INVENTION

The object was of us to provide a pendulum damper by means of which the damper frequency can be adjusted in a variable and simple manner with an unchanged pendulum length.

It is now been found that pendulum dampers which have no or do not have exclusively conventional horizontal springs, but are fitted with relatively short vertical springs having a progressive or non-linear overall spring characteristic line, are able to achieve the object set.

The invention thus relates to a vibration damper for tall slim buildings and structures, in particular wind turbines, which essentially comprises a pendulum having a damper mass and a spring device, where the spring device is installed below the damper mass in such a way that its overall spring force acts essentially in the vertical direction and has a non-linear or progressive overall spring characteristic line due to spring regions of different spring force which are present, and the damper mass is connected to an attachment point below the vibration damper inside the structure via this spring device, preferably via a bar or rod, where the progressive/non-linear spring characteristic line is achieved by at least two spring regions having different spring stiffness.

In a preferred embodiment of the invention, the spring device has a first spring region having a first defined spring stiffness and a second spring region having a second defined spring stiffness which is different from the first spring stiffness. Thus, in accordance with the invention, the first spring stiffness is in a range <200 N/mm, preferably <150 N/mm or <100 N/mm, for example between 3 and 200 N/mm, preferably between 30 and 150 N/mm, while the second spring stiffness is in a range >200 N/mm, preferably >500 N/mm or >1000 N/mm, for example between 200 and 3000 N/mm, preferably between 500 and 1500 N/mm.

The spring device according to the invention comprises one or more essentially vertical or vertically acting springs, which can be employed as compression and/or tension springs. In accordance with the invention, "essentially vertical" is taken to mean the vertical alignment or action of the springs including a maximum deviation of 30°. Correspondingly, a "vertical spring" is taken to mean a spring which is "essentially vertical".

If the spring device of the pendulum damper according to the invention comprises only one vertical spring, the different spring stiffnesses are provided by different regions along the spring (7), so that the spring as a whole has a progressive spring characteristic line. This enables a soft spring to act in normal operation and a stiff spring to prevent the damper mass (3) from deflecting out in the case of extreme events. This can be achieved, for example, by different coiling (density, diameter,) or by means of different materials or different thickness of the spring wire. A corresponding design of the spring also enables the spring regions within the spring to become fully compressed one after the other, which allows the spring stiffness to increase via the damper amplitude.

In another embodiment of the invention, the spring device comprises two or more, for example two, three, four, five or six vertical springs, where these two, three, four, five, six or more vertical springs can be connected in series or parallel. Combinations of series and parallel connection are in principle also possible. Here too, the progression of the spring characteristic line can be influenced by influencing certain springs, which can likewise be designed as tension and compression springs.

In a further variant of the invention, a plurality of vertical springs can act in parallel. The omission/addition of vertical springs enables the frequency to be additionally/likewise modified. A combination of horizontal springs and vertical springs is furthermore conceivable, as is the replacement of individual springs in such a combination by corresponding weights, which ultimately enables the frequency to be increased, or, on removal of the weight, reduced.

In general, these various vertical springs or groups of vertical springs have a defined spring stiffness which is different from the other vertical springs or groups of vertical springs, so that a desired larger or smaller spring stiffness region which is matched to the conditions of the structure to be damped can be covered, enabling a variable progressive spring characteristic line of the overall spring device to be established.

The invention relates, in particular, to a corresponding vibration damper which has at least two vertical springs of different spring stiffness, where the first vertical spring has a spring stiffness of >3 N/mm to <200 N/mm, preferably 50 to 150 N/mm, and the second vertical spring has a spring stiffness of >200 N/mm to <3000 N/mm, preferably 300 to 1500 N/mm.

DETAILED DESCRIPTION OF THE PREFERRED EMBODIMENT(S)

As already explained above, it is desirable to keep the deflection of the pendulum as small as possible over the entire range when vibrations occur in the structure, which is sensible, in particular for space reasons, in the usually very narrow towers of a WT or another tall building. This means that the separation between pendulum mass, to which the spring device is attached on one side directly or via a piece of cable, bar or rod, and the attachment point, which is installed below the pendulum damper and below the spring device in the structure and is in turn connected to the other end of the spring device directly or via a piece of cable, bar or rod, should, in the case of medium-sized to large structures, not be greater than 5 or 6 m, preferably <3 m, in particular <2 m, for example 0.5 m to 5.0 m, preferably 1.0 to 3.0 m.

In accordance with the invention, the damper frequency is thus influenced by the use of vertical springs instead of horizontal springs. In variant 3 (FIG. 3), these horizontal springs (4) are replaced by one or more vertical springs (7).

Figure 3:
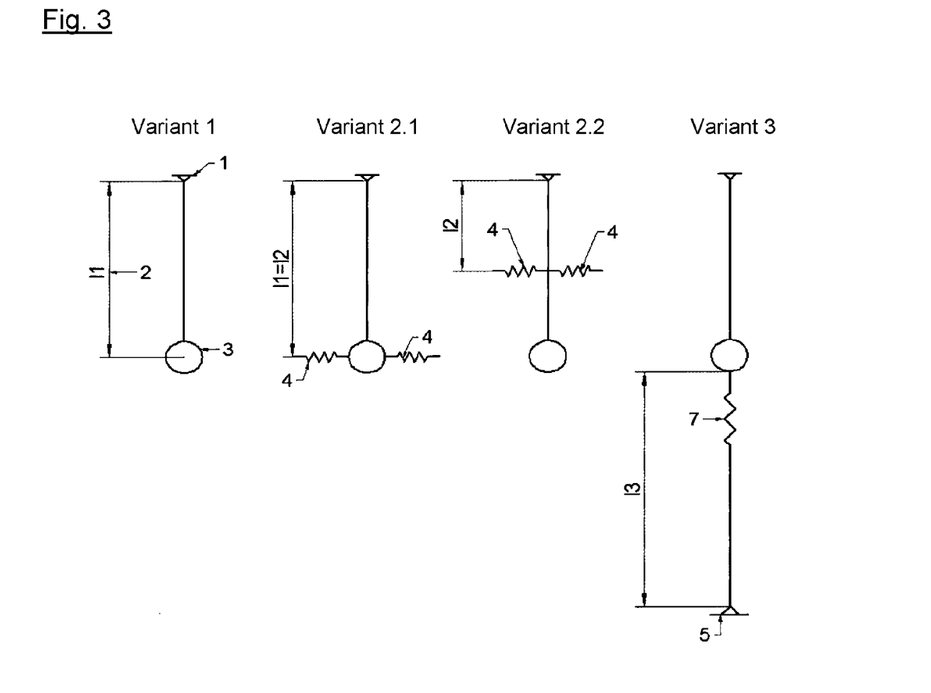
FIG. 3 shows diagrammatic views of variants 1, 2.1, 2.2, and 3 of a simple pendulum damper.
Figure 4:
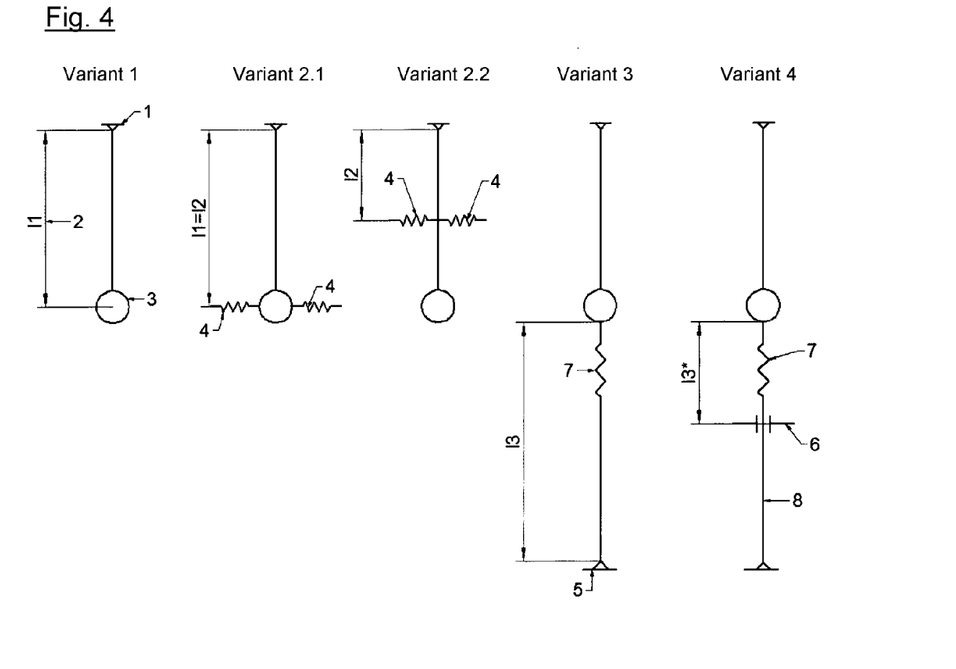
FIG. 4 shows diagrammatic views of variants 1, 2.1, 2.2, 3, and 4 of a simple pendulum damper.
Figure 5:
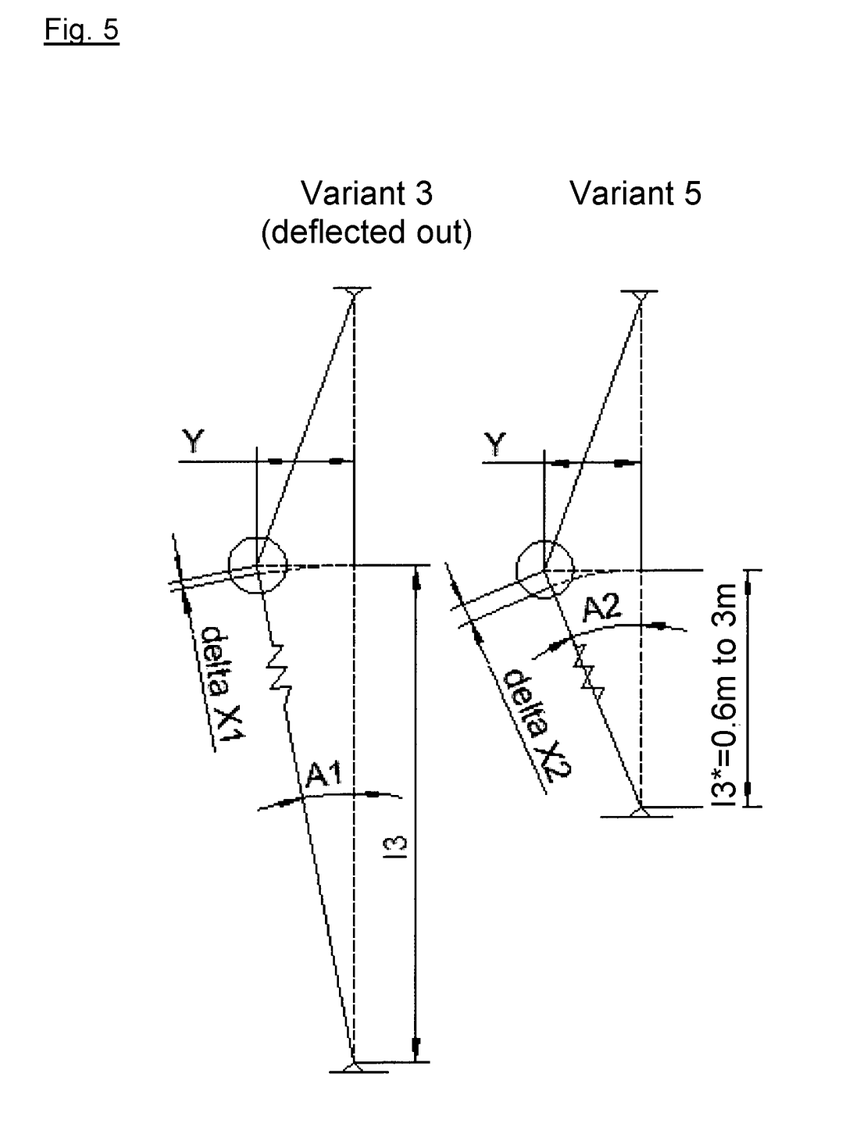
FIG. 5 shows diagrammatic views of a simple pendulum damper with variant 3 deflected out and variant 5 with a shorter spring length.

The physical correlation can be described as follows for a point mass:

$$f = \frac{1}{2*\pi} * \sqrt{\frac{m*g + F_p*(1+l_1)}{m*l_s}} \rightarrow \text{Equation 3; Variant 3 + 4 + 5}$$

g→gravitation constant [m/s^2]
l1→pendulum length (2) [m]
l3→length from connection point of cable (5) to damper mass (3) [m]
$F_F$→pretension force of vertical spring (7) [N/m]
m→damper mass (3) [kg]

It can be seen that the damper frequency can now be adjusted via a number of parameters. In this constellation, the damper frequency can be influenced by the vertical pretension force and not by the spring stiffness of the vertical spring(s) (7). This has the advantage that an entire frequency range can be covered with one vertical spring (7) and the spring does not, as is the case in the prior art, have to be replaced by one having a different spring stiffness. From domestic use, this phenomenon is known from a guitar string. If the pretension force in this is increased, the note/frequency is higher, while the spring stiffness of the string remains constant.

In addition, the dynamic displacement of the vertical spring (7), in relation to variant 2, is smaller for the same displacement of the damper mass (3). This enables a durable design of the spring. The longer the dimension 13 here, the smaller the dynamic change in length of the vertical spring (7) in relation to the movement of the damper mass (3). The longer the dimension 13 here, the less the influence of the vertical spring (7) on the damper frequency. This effect can be utilised positively in that, as also in the case of a guitar string, the dimension 13 is shortened to the dimension 13* (variant 4, FIG. 4). This causes the damper frequency to increase significantly for the same pretension force of the vertical spring. This shortening can be achieved by a stop ring (6), which can be moved in the vertical direction or alternatively is mounted in a fixed manner at one position. In the latter case, this stop ring (6) represents the fixed point of action of the spring.

In a further embodiment of the invention, the damper according to the invention has a movable or fixed stop or attachment device between the lower end of the spring device and the attachment point on the structure, enabling the separation between attachment point and spring device to be shortened and lengthened, so that the frequency of the damper can be rendered variable by the consequent lengthening or compression of the spring device. As already described above, a significantly higher damper frequency is required during the erection phase of the WT. This can be achieved in accordance with variant 4 by the shortening to dimension 13*. When erection of the structure is complete, a significantly lower damper frequency is required. In order to meet this requirement, the stop ring (6) is de-installed or moved downwards. The damper frequency drops, since dimension 13 and not 13* now determines the damper frequency. The fine tuning of the damper frequency can now be carried out by increasing/minimising the pretension force of the vertical spring (7). It must be ensured here that the vertical spring (7) is located above the stop ring (6). If the damper mass (3) moves in this constellation, relative movement between the cable (8) and the stop ring (6) is prevented. Conversely, the damper frequency can be increased by raising or introducing the stop device.

If a damper of this type or a similar damper is installed in a wind turbine, large amplitudes of the damper mass (3) may result due to external influences (for example emergency shutdown, gusts, switch-off operations). In order to keep the vibration displacement of the damper mass (3) small in these situations (which may be necessary in order to prevent the pendulum from hitting the tower wall), the dimension 13* should be chosen short (e.g. between 0.3 m and 6 m). Variant 5 (FIG. 5) arises as follows:

if, in combination with the short length of 13*, a vertical spring (7) which has a large spring stiffness is now installed, significantly smaller deflection displacements (Y) of the damper mass (3) result compared with variant 3 (deflected out) with lower spring stiffness and larger 13. The smaller the dimension 13* is selected, the greater the deflection angle (A2) of the vertical spring (7) becomes, with the same deflection displacement (Y) of the damper mass (3). This results in greater angled tension of the spring, which counters the movement of the damper mass (3) and limits the amplitude of the damper mass during operation and extreme events.

In the case of variant 5, a greater change in length (delta X2) of the vertical spring (7) results compared with variant 3 (deflected out), for the same deflection displacement (Y). The spring force increase which results from this is calculated as follows:

$$\text{increase in spring force} = C * \text{delta } X$$

C→spring stiffness of spring (7)
delta X→change in length of the spring (7) during deflection of the damper mass (3)

It can be seen from the formula that in the case of variant 5 the increase in spring force rises to a greater extent than in the case of variant 3 (deflected out).

If a vertical spring (7) having a large spring stiffness is now installed in a corresponding pendulum damper, the spring force increases significantly above the target level, even in the case of small damper amplitudes. It can be seen from Equation 3 that the damper frequency is consequently likewise increased significantly, which in turn has an adverse effect on the damper action.

Figure 6:
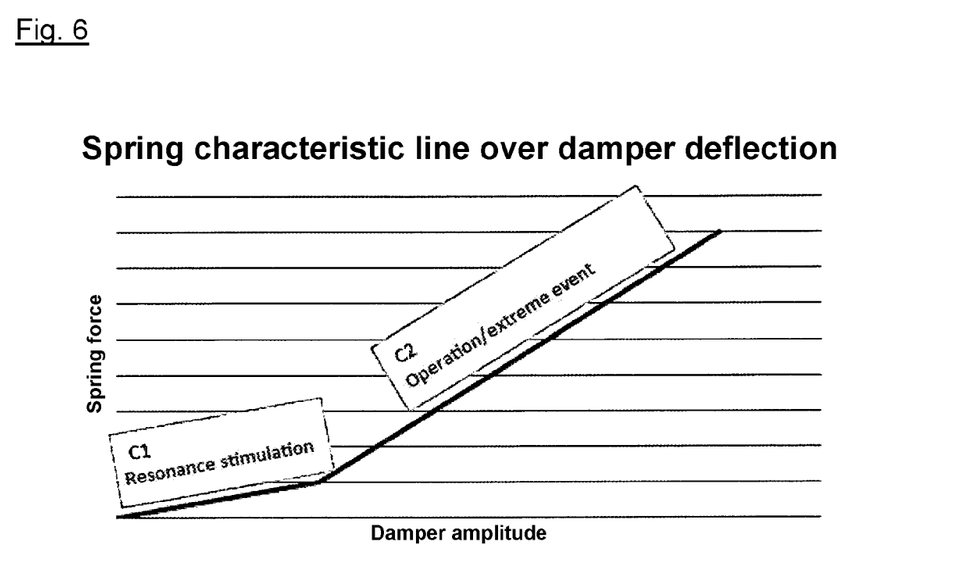
FIG. 6 shows a graph of spring force plotted against damper amplitude.

This problem can be solved by aiming at change in the spring force of the vertical spring (7) with the damper amplitude as shown in FIG. 6. This can be achieved in accordance with the invention by a vertical spring device, which can have a progressive or non-linear spring characteristic line over the damper deflection.

A distinction is made here between a "resonance stimulation" region and "operation/extreme event" region. A passive damper (as described here) can only act in the case of harmonic force stimulation. This harmonic force stimulation is only present in the case of "resonance stimulation". In operation or during extreme events, by contrast, a stochastic force stimulation with large damper amplitudes is present. In general, there is no damper action in the case of these structure states with the passive damper described here. Rather, the requirement is to keep the damper amplitudes small in the case of operation/extreme events and only to ensure a damper action in the case of resonance stimulation (small damper amplitudes).

The spring stiffness C1 of the vertical spring (7) is small in the resonance region. If the damper amplitudes now increase during operation or in the case of extreme events, the damper enters the region of high spring stiffness C2. The restoring forces of the vertical spring (7) thus increase significantly, which significantly reduces the damper amplitudes in these structure states. The whole is to be regarded in combination with the short vertical spring (7) from variant 5, which additionally increases the restoration component.

In accordance with the invention, the combination of a relatively short (0.3 m-3 m) vertical spring device having a progressive spring characteristic line provides a pendulum damper of variable frequency and amplitude which can be employed in the case of extreme states, normal states and states as arise during the erection, modification or de-installation of a vibration-sensitive structure or building. This enables the pendulum damper to be built larger within the tower without the fear of collisions with the walls of the tower or building or the internal structures located therein. Furthermore, an additional stop can be omitted, since the damper amplitudes generally come out smaller.

In a further embodiment, the vibration damper according to the invention additionally has a mechanical or hydraulic, mobile or fixed device for changing and adapting the pretension of the spring device by subjecting the spring device or parts thereof to compression or tensile loads.

The invention thus also relates to a corresponding vibration damper in which the separation between attachment point and spring device can be shortened and lengthened again by means of a movable or fixed stop or attachment device, so that the frequency of the damper can be varied or adapted by the consequent expansion or compression of the spring device. The invention furthermore also relates to a vibration damper which additionally comprises a mechanical or hydraulic, mobile or fixed device for changing and adapting the pretension of the spring device.

Figure 7:
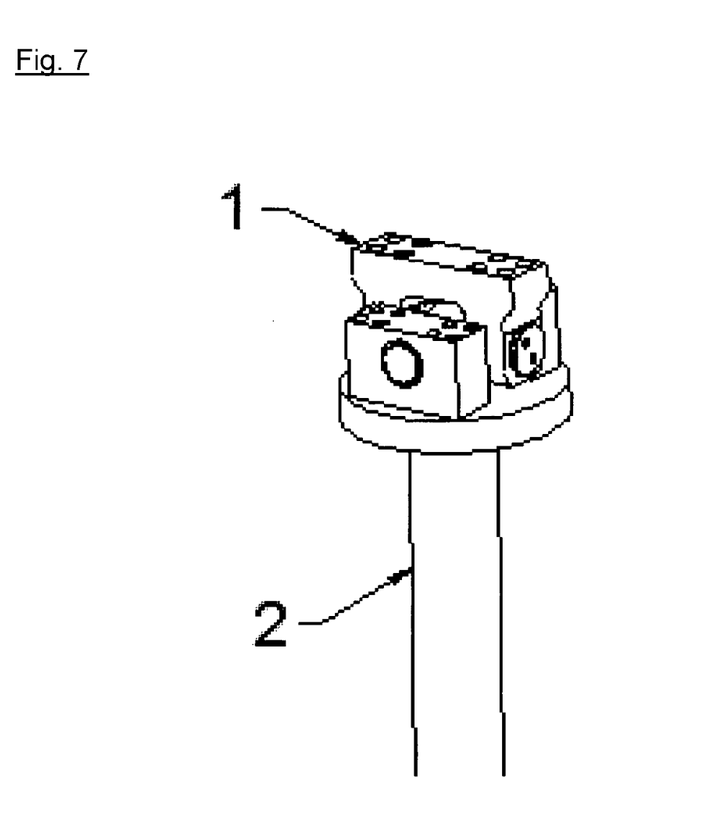
FIG. 7 shows a diagrammatic view of an upper suspension point of a damper designed as a variable joint.

In accordance with the prior art, the pendulum length (2) in a pendulum damper is achieved by cables. The damper is consequently able to rotate torsionally in the cables. The vertical springs (7) and also the dampers would thus have to follow this rotation, which would result technically in malfunctions. In an alternative embodiment according to the invention, the pendulum length (2) can be replaced by a torsionally rigid element (tube). At the same time, the upper suspension point of the damper (1) must be designed as a variable joint, for example a universal joint. This prevents torsional rotation in the case of possible movement of the damper mass (3) through 360° (FIG. 7). The invention thus relates to a corresponding vibration damper in which the pendulum consists of a rod or tube, on the lower end of which the damper mass, which has an attachment point for the spring device, is mounted and on the upper end of which a joint that ensures free movement of the pendulum through 360° is mounted, so that torsional rotations are impossible.

The upper suspension point of the damper can take place, depending on the nature of the structure, tower or building, at the respective upper end of the tower, structure or building or alternatively at any desired position in the upper half or in the upper third. It is also possible for the damper mass (3) to be suspended on one or more suspension points of damper (1). In addition, it is also conceivable for a universal joint to be installed directly on the damper mass (3) and at the connection point of damper (1) and for a torsionally rigid element to be installed in between.

As already explained the number of times, the dampers according to the invention are suitable, in particular, for installation in WTs. The invention thus also relates to a wind turbine which has a vibration damper according to the invention.

The invention relates, in particular, to the use of the damper according to the invention for the prevention and reduction of vibration events during the construction and operation of a wind turbine of this type or other vibration-sensitive buildings, but also for the reduction and prevention of large damper amplitudes in the case of vibration-induced extreme events and of resonance-induced vibrations of the structure or building in the normal state or normal operation.

In the description, drawings and claims, the following items are referred to:

| | |
|---|---|
| 1 | Damper suspension point |
| 2 | Pendulum length |
| 3 | Damper mass |
| 4 | Horizontal spring |
| 5 | Cable connection point |
| 6 | Stop ring |
| 7 | Vertical spring |
| 8 | Cable |

The invention claimed is:

1. A vibration damper, a frequency of which being variably adjustable to an inherent frequency of a tower of a wind turbine, the vibration damper comprising:
a pendulum having a damper mass and a spring device such that the spring device is vertically installed below the damper mass, and the damper mass is connected at a separation distance directly, or via a piece of cable, bar, or rod, to an attachment point on the structure or building and the damper mass is further connected via the spring device below the damper mass,
wherein
(i) the separation distance between the damper mass and the attachment point is not greater than 5 meters and can be effectively shortened or lengthened by subsequent compression or extension of the spring device in response to the movement of the pendulum and a separation distance between the attachment point and the spring device is effectively shortened and lengthened by a movable or fixed stop or the attachment device so that the frequency of the damper can be varied by subsequent extension or compression of the spring device, and
(ii) the spring device comprises one of:
(a) at least one soft first vertical spring having a spring stiffness of <200 N/mm, and at least one stiff second vertical spring having a spring stiffness of >200 N/mm, and the first and second vertical springs being connected to one another, or
(b) at least one vertical spring comprising a soft first spring region having a spring stiffness of <200 N/mm, and a stiff second spring region having a spring stiffness of >200 N/mm, and the difference in the spring stiffness being distributed over an entire length of the at least one vertical spring,
wherein under operating condition the soft spring or the soft spring region is effectively only for prevention and reduction of resonance-induced vibrations in a normal state or during normal operation, and the stiff spring or the stiff spring region is effectively only for the prevention and reduction of large damper amplitudes in a case of stochastic force stimulation vibration-induced extreme events and states as arise during erection, modification, and de-installation of the wind turbine.

2. The vibration damper of claim 1, wherein the spring device comprises the at least one soft first vertical spring and the at least one stiff second vertical spring the at least one soft first vertical spring has a spring stiffness in a range between 50 and 150 N/mm, and the at least one stiff second vertical spring has a spring stiffness in a range between 300 and 1,500 N/mm.

3. The vibration damper of claim 1, wherein the spring device comprises the soft first spring region and the stiff second spring region, and the first spring region has a spring stiffness in a range between 30 and 150 N/mm, and the second spring region has a spring stiffness in a range between 500 and 1,500 N/mm.

4. The vibration damper according to claim 1, wherein the different spring stiffness of the first and second spring region of the at least one vertical spring is effectuated by different coiling of the spring.

5. The vibration damper according to claim 1, wherein the vertical springs are at least one of tension springs or compression springs.

6. The vibration damper according to claim 1, wherein the separation between damper mass and attachment point is 0.5 meters to 5.0 meters.

7. The vibration damper according to claim 6, wherein the separation between damper mass and attachment point is 1.0 m to 3.0 meters.

8. The vibration damper according to claim 1, wherein the damper mass is connected to the attachment point via a cable, a bar or a rod.

9. The vibration damper according to claim 1, wherein the pendulum consists of a rod or a tube, on a low end of which a damper mass which has an attachment point for the spring device is mounted, and on an upper end of which a joint is mounted which ensures free movement of the pendulum without any torsional rotation being possible.

10. A wind turbine, wherein the wind turbine has a vibration damper according to claim 1.

* * * * *